United States Patent
Freiherr Von Gagern et al.

(10) Patent No.: US 8,774,727 B2
(45) Date of Patent: Jul. 8, 2014

(54) METHOD AND TEST INSTRUMENT FOR ANALYZING A DEVICE COMMUNICATING VIA A RADIO LINK

(75) Inventors: Christoph Freiherr Von Gagern, Munich (DE); Uwe Bäder, Ottrobrunn (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 513 days.

(21) Appl. No.: 13/147,794

(22) PCT Filed: Jan. 12, 2010

(86) PCT No.: PCT/EP2010/000109
§ 371 (c)(1),
(2), (4) Date: Aug. 3, 2011

(87) PCT Pub. No.: WO2010/089013
PCT Pub. Date: Aug. 12, 2010

(65) Prior Publication Data
US 2011/0294437 A1    Dec. 1, 2011

(30) Foreign Application Priority Data

Feb. 9, 2009  (DE) .................. 10 2009 008 089
Apr. 30, 2009 (DE) .................. 10 2009 019 685

(51) Int. Cl.
*H04B 17/00*      (2006.01)

(52) U.S. Cl.
USPC ............. 455/67.12; 455/67.11; 455/423; 455/115.1; 455/226.1

(58) Field of Classification Search
USPC ............. 455/67.12, 67.11, 226.1, 115.1, 423
See application file for complete search history.

(56) References Cited

U.S. PATENT DOCUMENTS

| | | | |
|---|---|---|---|
| 7,359,701 B2* | 4/2008 | Zhao et al. | 455/423 |
| 7,773,964 B2* | 8/2010 | Ozaki et al. | 455/226.1 |
| 8,358,992 B2* | 1/2013 | Yu | 455/261 |
| 2003/0003883 A1* | 1/2003 | Wallace et al. | 455/115 |
| 2005/0176375 A1* | 8/2005 | Bednasz et al. | 455/67.12 |
| 2008/0056340 A1* | 3/2008 | Foegelle | 375/224 |

FOREIGN PATENT DOCUMENTS

DE    10 2007 014 692 A1    10/2008
WO    2006/047677 A1    5/2006

OTHER PUBLICATIONS

International Search Report mailed Apr. 22, 2010, in corresponding International Application No. PCT/EP2010/000109, filed Jan. 12, 2010.

* cited by examiner

*Primary Examiner* — April G Gonzales
(74) *Attorney, Agent, or Firm* — Christensen O'Connor Johnson Kindness PLLC

(57) ABSTRACT

The invention related to a method and to a test device for analyzing a device communicating via a radio link. Said device comprises a plurality of antennas for communicating, together comprising an antenna arrangement. The device under test is first disposed in a first position relative to a radio field. A value of at least one piece of channel state information describing a quality of the antenna arrangement obtained via the return channel is determined in said relative position. A change in the relative position of the device under test relative to the radio field is subsequently performed. A second value of the at least on piece of channel state information is determined in said changed, new relative position.

10 Claims, 2 Drawing Sheets

METHOD AND TEST INSTRUMENT FOR ANALYZING A DEVICE COMMUNICATING VIA A RADIO LINK

Figure 1:
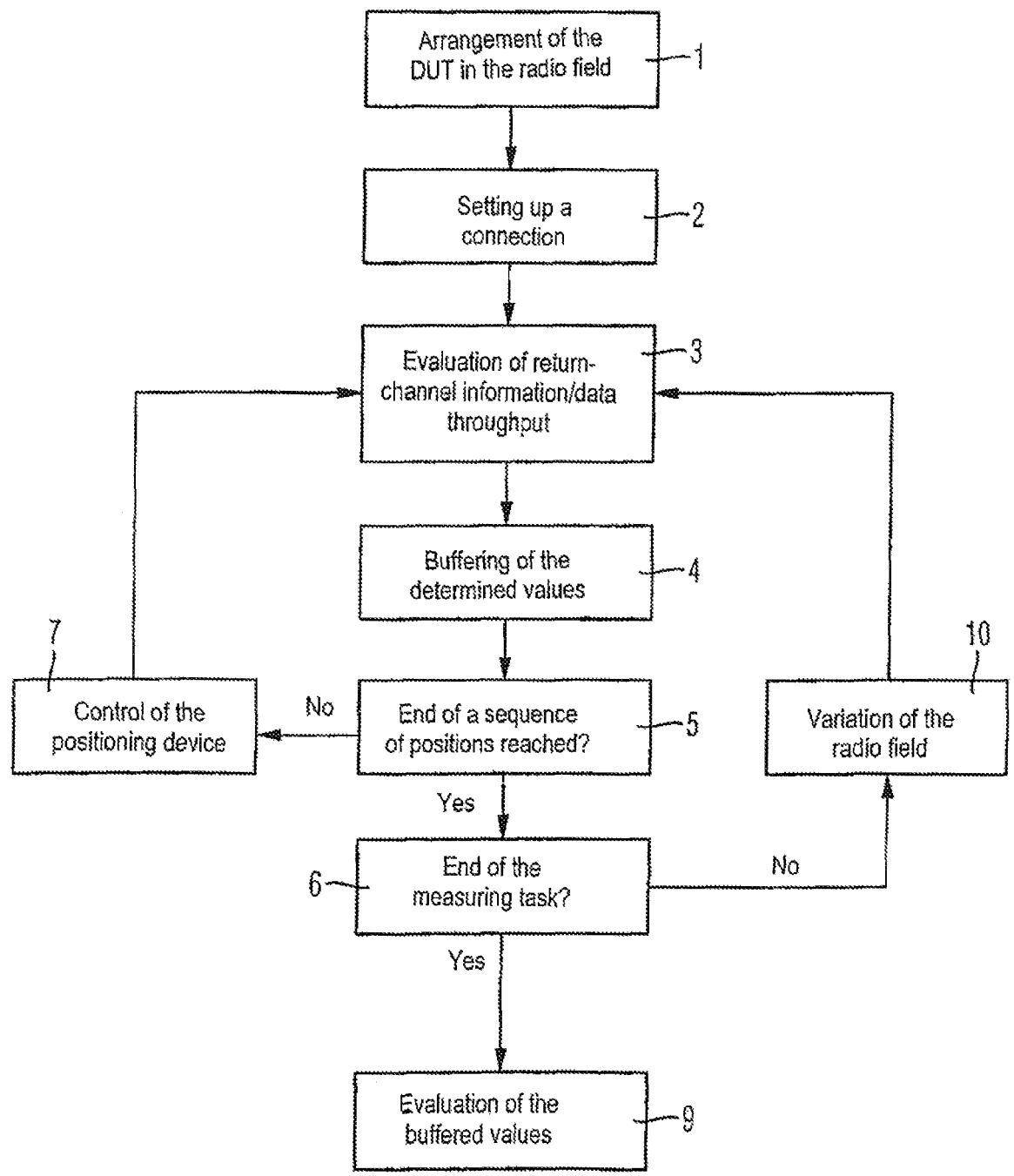

The invention relates to a method and a test instrument provided for the implementation of the method for analysing a device communicating via a radio link with an antenna arrangement comprising a plurality of antennas.

An arrangement for testing MIMO (Multiple Input Multiple Output) systems is known from US 2008/0056340 A1. A device under test (DUT, Device Under Test) is arranged in a test chamber with the minimum possible reflections. Apart from the DUT, a plurality of antennas is arranged in the test chamber. For the implementation of the test, the individual antennas can be controlled via a transmission-channel simulator. For the implementation of the test, a given channel configuration is generated by the channel simulator and the antenna arrangement. During the test, the parameters of an antenna arrangement emulating, for example, a base station or the channel configuration are varied.

The method described has the disadvantage that only the external influences of a real environment are covered by the test method. However, with modern transmission systems in which multi-antenna systems are used, a particular problem is that the orientation of the individual antennas of such an antenna arrangement within the radio field has an influence on its function. Accordingly, the influence of positioning within the radio field can only be registered through lengthy measurements especially, for example, with mobile-radio devices in which the small size is already associated with a considerable spatial proximity and accordingly also with coupling effects of the individual antennas.

Accordingly, the object is to provide a method and a test instrument, in which a device with a multi-antenna arrangement can be analysed in an improved manner.

In the case of the method according to the invention, a link is set up between a device under test and a test instrument. The test instrument, or more precisely, its radio-signal-generating unit, and the device to be analysed communicate with one another via a radio link. For the communication, the device to be analysed uses a plurality of antennas, which together form an antenna arrangement. The device under test is first arranged in a first position relative to a radio field generated by the test instrument. In this position, a first value is determined for at least one channel-status information communicated to the tester in a return channel from the device under test. After this first of value has been determined, the position of the device under test relative to the radio field is changed. In this changed position, a second value of the at least one channel-status information is determined. By registering the values of the same channel-status information in a first position and in at least one second position, inferences can be drawn regarding the change, for example, in a quality of the mobile-radio device through a change in the orientation of the antenna arrangement within the radio field.

For this purpose, a test instrument according to the invention is provided. The test instrument provides a radio-signal-generating device for generating a radio field and an analysis device. This radio field corresponds, for example, to the radio field of a base station operating according to a given mobile-radio standard. The test instrument has a retaining device for arranging the device under test within the radio field. In order to determine values of the at least one channel-status information, an analysis device is provided in the test instrument. According to the invention, the retaining device is connected to a positioning device. With such a positioning device, the retaining device can be rotated within the chamber about at least one spatial axis, so that the relative position of the device under test is adjustable relative to the radio field generated by the tester. The analysis device is set up in such a manner that a value for the at least one channel-status information is determined in every relative position.

The radio-signal-generating device is, for example, a part of a base station simulator which is disposed in bidirectional link with the DUT according to a mobile-radio standard. In evaluating the channel-status information, a limitation to only one value of channel-status information is not provided. In particular, it is advantageous to evaluate via the analysis device all of the channel-status information retransmitted via the return channel which contains information about the momentary quality of the transmission channels. In the case of LTE (Long Term Evolution), this value can be, for example, a CQI (Channel Quality Indicator), RI (Rank Indicator) and PMI (Pre-coding Matrix Indicator).

The dependent claims relate to advantageous further developments of the method according to the invention and the test instrument according to the invention.

By preference, several position changes are implemented in succession, wherein the positioning can work through an orientation pattern established in advance. In particular, a high level of reproducibility and comparability of tests implemented with different devices under test can be achieved as a result. Accordingly, it is also particularly specified that the radio field is constant for working through a sequence of positions in order to mask influences which do not originate from the orientation of the antenna arrangement.

According to another advantageous further development, a variation of the radio field can be implemented for at least some of the relative positions adopted by the device under test. In this context, after working through a sequence of relative positions with a constant radio field, the same sequence of positions or a subset of the latter is worked through with different settings for the radio field. In this case, the radio field is held constant within the sequence.

The values determined for the channel-status information are preferably buffered dependent on size, associated position and the radio field predominating in each case during the measurement.

Alongside the radio-signal-generating device, the analysis device and the positioning device, the test instrument according to the invention preferably provides a control device. This control device is connected to the analysis device and the positioning device. Accordingly, the procedure during the implementation of a test case is controlled centrally by the control device. It coordinates the implementation of the actual measurement, the determination of values for the channel-status information and the adoption of a new position, provided no further measurement is required in the previously set position. In particular, the control device is set up in such a manner that a pre-defined test scenario with a variation of the radio field can be implemented after the determination of values in the successively changed new positions. For this purpose, the control device communicates to the radio-signal-generating device a test scenario or a sequence of settings of the radio field, which can be worked through sequentially by the radio-signal-generating device. Accordingly, for every individual setting of the radio field, the sequence of positions is worked through afresh and the values of the channel-status information are determined again.

The test instrument provides a buffer in which the values for the individual parameters are stored dependent upon the position and the adjusted radio field. The buffer is preferably connected to the control device and the analysis device. By means of the control device, it is possible to write into the buffer which position has just been set and preferably also which radio field has been applied, and, by means of the analysis device, the values determined from the information in the return channel are stored in the buffer in a manner associated with the position information.

Figure 2:
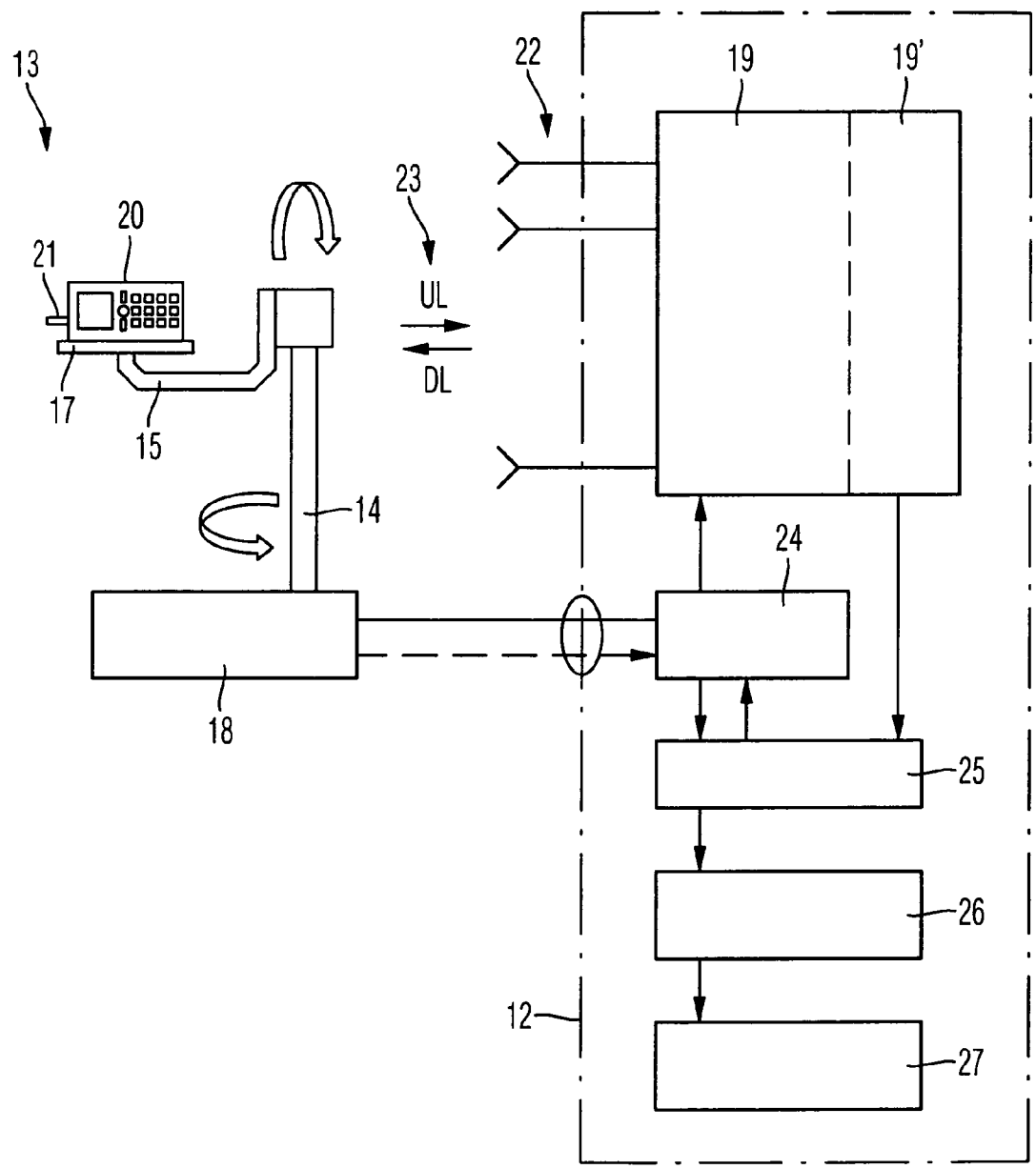

An exemplary embodiment of the method according to the invention and the test instrument used for this purpose is presented in the drawings and explained in greater detail in the description below. The drawings are as follows:

FIG. 1 shows a schematic presentation of the procedure of the method according to the invention; and FIG. 2 shows a block-circuit diagram of a test instrument for the implementation of the method according to the invention.

The arrangement for the implementation of the method according to the invention is explained in greater detail below with reference to FIG. 2. Initially a DUT (Device Under Test) for which an analysis is to be implemented, is arranged within a radio field. In general, such a DUT is a mobile-radio device. This arrangement 1 is implemented by fixing the DUT in a retaining device. The retaining device is disposed in a test chamber. The test chamber is designed especially in such a manner that undesirable reflections or propagation paths are suppressed as far as possible. Furthermore, the antennas of a test instrument are arranged in the test chamber. Radio signals are exchanged in both directions between the antennas of the test instrument and the antennas of the DUT.

After the DUT has been arranged in the radio field in step 1, a connection is set up across the radio link. In this context, the test instrument behaves like a base station which operates according to the mobile-radio standard of the device under test. After the connection has been set up in step 2, at least one channel-status information communicated via a return channel is analysed. A channel-status information of this kind can be, for example, a CQI, an RI or a PMI. This information is exchanged according to the standard between the mobile-radio device and a base station, which is replaced during the implementation of the test by the tester (communications tester) emulating the base station. Accordingly, the channel-status information is rapidly available to the tester thereby achieving a short testing time.

Moreover, the data throughput can also be determined in step 3. The determined values of the data throughput are stored in a buffer with reference to the position in which the mobile-radio device was arranged within the test chamber (step 4).

Step 5 questions whether the end of the measurement has been reached within a sequence of positions. For this purpose, it is determined whether a pre-defined end position has already been reached. The last position of a sequence of relative positions is defined as the end position. If the end position has not yet been reached, the positioning device, which is connected to the retaining device, is controlled in step 7 in such a manner that the next relative position in the radio field is adopted. For example, this may mean a rotation through 30° about a spatial axis.

When the last position of a sequence of positions has been reached, a question is asked regarding whether the end of a measuring task has also already been reached (step 6). A measuring task can comprise, for example, several sequences with identical position sequences to be worked through, wherein a variation of radio field is applied for each run through the sequences. Accordingly, in step 6, if it is determined that the overall measuring task has not yet been completely worked through, a variation of the radio field is implemented in step 10. According to a preferred embodiment, a sequence of positions concludes with the start position again.

In the exemplary embodiment already described above, in which positions are adopted in 30° steps, the start position is reached again after a sequence of 12 steps. The radio field is then varied. In this new configuration of the radio field, the sequence of positions is then worked through again, wherein at least one value for channel-status information is again recorded and buffered dependent upon the position and the radio field on which the measurement was based.

However, as an alternative to the preferred exemplary embodiment presented above, it is also conceivable to implement a variation of the radio field at every position of the sequence. After the variation of the radio field is completed, and the channel-status information has been recorded, the relative position can again be changed. Once again, a variation of the radio field is possible there, and several values can be recorded at the same position.

Moreover, if it is determined at the end of a sequence of positions that the measuring task has been concluded, an evaluation of the buffered values is implemented. In the exemplary embodiment described, the buffered values relate to the channel-status information values: CQI, RI or PMI.

It goes without saying that the named parameters CQI, RI and PMI are only examples.

Steps 3-7 are worked through in a cyclical manner so long as new positions within a sequence are still controlled.

In particular, the entire chamber can also be sampled by rotating the mobile-radio device systematically about the three spatial axes in given angular steps (for example, 30°), and implementing a new measurement in each case. For each position of the sequence adopted, further values of the channel-status information are determined. The end position would then be reached, for example, when a 360° rotation about one of the axes has been completed. A complete sphere can be covered, for example, with a stepwise rotation through a total of 360° in the azimuth direction and an elevation of a total of 180°.

In the simplest case, an evaluation can be provided in a visual display of the determined values over the positional angle adopted in each case.

As already explained above, a variation of the radio field can be implemented in given positions or in all positions adopted relative to the radio field. In particular, a sensitivity measurement is possible in addition to the determination of the spatially-resolved values of the channel-status information. In this context, the power of the signals communicated in the downlink from the emulated base station to the mobile-radio device is reduced stepwise until a limit value for the block-error rate is reached by the DUT. Furthermore, the data throughput can also be determined.

A test instrument structured substantially as shown in the block-circuit diagram of FIG. 2 is used for the implementation of the method according to the invention. Alongside the tester 12, which receives and transmits the signals for communication with the mobile-radio device 20, the test instrument 11 comprises a positioning device 13. The positioning device 13 in the exemplary embodiment presented provides a first rotatable carrier arm 14. A second rotatable carrier arm 15 is arranged on this first carrier arm 14. The axes, about which the first carrier arm 14 and the second carrier arm 15 are rotatable, are disposed perpendicular to one another. In this context, the arrows shown in FIG. 2 indicate the possible directions of movement. With such an arrangement, which should be understood only as an example, it is possible to position the device under test, in this example, a mobile-radio device 20, with any required orientation relative to the radio field.

The mobile-radio device 20 is fixed to the second carrier arm by means of the retaining device 17. The mobile-radio device 20 provides an antenna arrangement indicated only schematically, which comprises at least a first and a second antenna.

The tester 12 provides a radio-signal generating device 19. The radio-signal-generating device 19 is connected to the mobile-radio device 20 via a radio link 23. The radio link 23 comprises a downlink (DL) and an uplink (UL) direction. A plurality of antennas, which together form the antenna arrangement 22 of the emulated base station, is also provided in the radio-signal-generating device 19.

In particular, it is provided that the antenna arrangement 22 of the radio-signal-generating device 19 is more complex than conventional base stations, because a real radio field is simulated by means of a plurality of antennas in order to simulate different propagation paths of real radio signals.

For the movement of the first carrier arm 14 and of the second carrier arm 15 relative to one another, a drive 18 is provided. The drive 18 and the radio-signal-generating device 19 are connected to a control device 24. The control device 24 specifies to the drive 18 the position to be set for the mobile-radio device 20. As indicated by the dotted arrow, the attainment of the specified end position by the drive 18 can be reported back to the control device 24. The radio field to be set is communicated to the radio-signal-generating device 19 by the control device 24, which organises the procedure of a measurement series. Like the radio-signal-generating device 19, the control device 24 is also connected to a buffer 25. On one hand, test scenarios can be buffered in the buffer 25. Accordingly, in particular, the step width for controlling new positions of the mobile-radio device 20 can be buffered in the buffer 25. On the other hand, the respectively set position is communicated to the buffer 25 by the control device 24. In conjunction with this communicated position information, a value for a given channel-status information of the mobile-radio device 20 is determined through the analysis device 19' by evaluating the return channel (uplink). This value is communicated by the analysis device 19' to the buffer 25 and buffered there together with the position of the mobile-radio device 20 upon which the evaluation is based. The radio-signal-generating unit 19 and the analysis device 19' together form a communications tester.

As already described in the explanation of the method, several positions are controlled in succession. In each position, at least one measurement is implemented with a given radio-field configuration. Accordingly, at least one value pair comprising the positional information and the value of the respectively observed channel-status information is obtained. These value pairs are analysed by an evaluation unit 26 and displayed, for example, via a screen 27. In the case of an output via the screen 27, only graphic information on the characteristic of a given value dependent upon the position adopted by the mobile-radio device 20 and accordingly the antenna arrangement 21 is provided. Other output forms, for example, numerical, can, of course, also be used, or the values can be supplied for a further computer-supported analysis.

Changes which occur through the antenna arrangement 21 or its position in the chamber relative to a statically held radio field can be analysed readily and rapidly with regard to type and manner. The implementation of the two loops shown in FIG. 1 can also be reversed. That is to say, a measurement is initially implemented in each case for a given position, after which the radio field is varied once or more, and a new measurement is implemented. Only after the completion of the variation of the radio field, is a new position adopted, for which, once again, the radio field can be varied.

The invention is not restricted to the exemplary embodiment presented. In particular, individual features can be advantageously combined with one another.

The invention claimed is:

1. A method for analyzing a device communicating via a radio link, which uses an antenna arrangement comprising a plurality of antennas for the communication, with the following method steps:
arranging the device under test in a first relative position relative to a radio field;
changing the relative position of the device under test relative to the radio field; characterized in that,
in the first position, a first value of at least one channel-status information retransmitted in a return channel is determined and, in the changed relative position,
a second value of the at least one channel-status information is determined.

2. The method according to claim 1, characterized in that several position changes are implemented in succession, and a determination of a value for the at least one channel-status information is implemented in every relative position adopted.

3. The method according to claim 2, characterized in that the determination of the values of the channel-status information is repeated after a variation of the radio field for at least some of the relative positions adopted.

4. The method according to claim 1, characterized in that the values determined in every position are buffered in combination with the position.

5. The method according to claim 4, characterized in that, in the case of the implementation of a variation of the radio field, the values determined for every variation step are additionally buffered at every relative position adopted in combination with the radio field resulting from the variation.

6. The method according to claim 1, characterized in that a measurement of a data throughput between the test instrument generating the radio field and the device under test is additionally implemented.

7. A test instrument for analyzing a device communicating via a radio link, which uses an antenna arrangement comprising a plurality of antennas for the communication, wherein the test instrument comprising:
a radio-signal-generating device for generating a radio field,
a retaining device for arranging a device under test within the radio field,
an analysis device for determining values of at least one channel-status information transmitted from the device under test in a return channel, wherein
the retaining device is connected to a positioning device, characterized in that
the analysis device is set up in such a manner that a value can be determined in every relative position relative to the radio field for the at least one channel-status information.

8. The test instrument according to claim 7, characterized in that
the analysis device and the positioning device are connected to a control device.

9. The test instrument according to claim 8, characterized in that
the control device is set up in such a manner that, after the adoption of changed positions, a pre-defined test scenario with variation of the radio field can be implemented, wherein the sequence of the position is worked through again for every new radio-field configuration.

10. The test instrument according to claim 7, characterized in that
   the test instrument provides a buffer, which is connected to the control device and the analysis device.

* * * * *